Figure 1:
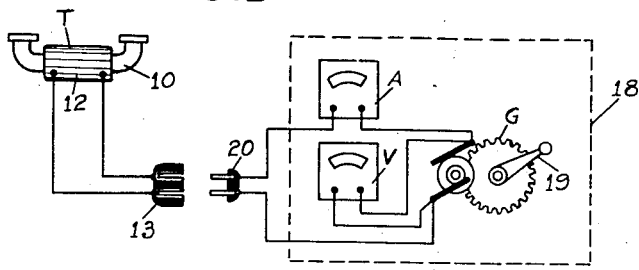

Jan. 2, 1934.   H. WICKSON   1,942,157
TESTING APPARATUS FOR TRAIN CONTROL DEVICES
Filed Sept. 4, 1930

INVENTOR
Harmon Wickson,
BY Neil D. Preston,
his ATTORNEY

Patented Jan. 2, 1934

1,942,157

UNITED STATES PATENT OFFICE 1,942,157

TESTING APPARATUS FOR TRAIN CONTROL DEVICES

Harmon Wickson, Rochester, N. Y., assignor to General Railway Signal Company, Rochester, N. Y.

Application September 4, 1930. Serial No. 479,714

4 Claims. (Cl. 175—183)

This invention relates to testing apparatus for testing the coils and inductive efficiency of receivers and inductors of train control system of the intermittent inductive type.

In a train control system of the intermittent inductive type, such as disclosed in the patent to Bushnell, No. 1,686,434, granted October 2, 1928, control influences are tranmitted from the trackway to the moving train inductively. This is accomplished by a receiver containing a primary heavily energized coil and a secondary coil, and a roadside inductor for transmitting an electro-magnetic influence from the primary to the secondary coil under danger traffic conditions. In order to render this inductor inactive under favorable traffic conditions a coil contained on the magnetic structure of the inductor is closed in a circuit of low resistance, to buck out, so to speak, the effect that the iron of the inductor would otherwise have on the car-carried receiver. From this brief description of the train control system the test of the receiver and inductor of which is under consideration, it is apparent that the primary and secondary coils of the receiver, as well as the bucking coil of the inductor, must have very little leakage between turns and must have the turns intact in order to assure safe operation of the system. The railroads upon which the above mentioned system has been installed must, therefore, periodically check the inductive efficiency of the inductors and receivers on their railway system. The manufacturer of the train control apparatus has found, after a long series of tests, that the inductive efficiency of these various devices may best be ascertained by measuring the impedance of these devices at a certain frequency. By reason of the fact that these railroad companies have a very large number of receivers and inductors to test periodically, it has been found expedient to supply the railroad company with fool-proof test apparatus.

In accordance with the present invention the test apparatus is mounted in a carrying case with the scales of voltmeters and ammeters readily visible, and with rheostats and circuit changing devices contained therein to enable the various test circuits to be made instantly after all the apparatus to be tested has been connected to the testing apparatus. These circuits are so arranged that any misoperation of the circuit controllers will not injure either the instruments of the test apparatus nor the devices to be tested.

Other objects, purposes and characteristic features of the invention will in part be apparent from the accompanying drawing and will in part be more particularly described hereinafter.

In describing the invention in detail reference will be made to the accompanying drawing, in which:—

Figure 2:
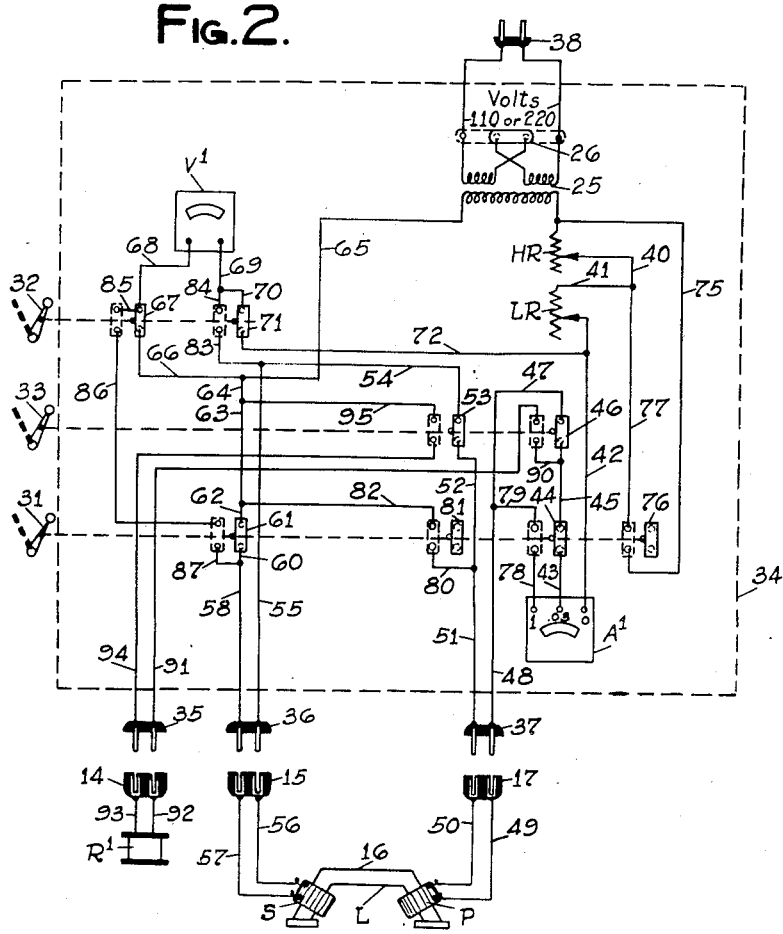

Fig. 1 illustrates apparatus for testing inductors in which the current supply is derived from a hand operated generator; and Fig. 2 shows test apparatus using commercial current for testing the receiver and the primary control relay of the car-carried apparatus.

Referring to the drawing the inductor T comprising a magnetic U-shaped yoke 10 and containing a bucking coil 12, the receiver L comprising a magnetic yoke 16 having a primary coil P and a secondary coil S, and the main relay $R^1$, comprise the devices of the train control system disclosed in the patent above referred to. In practice, the ends of the coil 12, the primary relay $R^1$, the secondary winding S and the primary winding P terminate in suitable quick detachable coupling elements such as elements 13, 14, 15 and 17 respectively, this to facilitate interchangeability of parts for replacement and for testing of these various devices.

Referring now to Fig. 1 the test apparatus including a hand operated alternating current generator G, an alternating current ammeter A and an alternating current voltmeter V, are housed in a suitable carrying case conventionally illustrated by a dotted rectangle 18, in such a manner that the crank 19 of the generator G projects from the carrying case. This generator G may be either an alternating current generator of the permanent magnet type, sometimes known as a magneto, or may be a direct current self excited generator of the shunt type having suitable rings associated therewith for supplying alternating current. In any event, the generator is particularly designed to give a definite and predetermined frequency when the crank 19 is operated at a speed to give a certain definite voltage. By this construction of the generator G the voltmeter V not only serves to indicate when the proper voltage is applied to the coil 12 of the inductor T, when the test apparatus is connected thereto by inserting the plug 20 in the socket 13, but also assures that this current is of the prescribed frequency at which the coil 12 is to be tested.

To use the apparatus shown in Fig. 1 after the coil 12 has been disconnected from its control circuits by removing the receptacle 13 and after the plug 12 of the test apparatus has been coupled with the receptacle 13, the crank 19 is operated until the voltage is of a predetermined value, at which time the current is read on the ammeter A. If the current indicated on the ammeter A falls between the predetermined current limits the coil 12 is pronounced to be in good condition.

Referring now to Fig. 2 of the drawing, since the car-carried apparatus is usually tested in the round-house, commercial alternating current is available, and in the test apparatus shown in Fig. 2 the transformer 25 may be supplied either 110 volts or 220 volts depending on the source available and depending upon whether the straps 26 are in the solid line or in the dotted line position, the solid line position indicating the 220 volt position and the dotted line position indicating the 110 volt positions. This transformer 25 as well as the volt meter $V^1$ and the ammeter $A^1$, the rheostats HR and LR, and the switch levers 31, 32 and 33 are housed in a carrying case conventionally illustrated by a dotted rectangle 34, the volt meter $V^1$ and the ammeter $A^1$, of course, having their scales visible from the outside of the carrying case.

In using the apparatus shown in Fig. 2, the primary control relay $R^1$ is disconnected from the car-carried apparatus by with-drawing the receptacle 14, and the secondary coil S and the primary coil P are disconnected from the car-carried apparatus by with-drawing the receptacles 15 and 17, after which the plugs 35, 36 and 37 are inserted in these respective receptacles. Alternating current of commercial frequency is of course supplied to the transformer 25 through the medium of the plug 38. The receiver L and the primary relay $R^1$ may now be tested by operating the switch levers 31, 32 and 33 to various positions adjusting the rheostats HR or LR until the proper voltage reading appears on the volt meter $V^1$ and by then reading the current on the ammeter $A^1$, and if these current values fall within the limits indicated on the following table the apparatus is pronounced to be in good condition:

| Test No. | Test of— | Switch positions | | | Applied volts | Current range | Induced volts range |
| --- | --- | --- | --- | --- | --- | --- | --- |
| | | 31 | 32 | 33 | | | |
| 1 | Pri. sec. series impedance. | Right | Right | Right | 70 | .005–.012 | |
| 2 | Pri. impedance | Left | Right | Left | 70 | .05 –.3 | |
| 3 | Sec. induced volts. | Left | Left | Left | 70 | | 116–136 |
| 4 | Relay impedance. | Right | Right | Right | 75 | .005–.01 | |

Referring to the above table it will be noted that the impedance of the entire receiver L, that is, the impedance of the primary coil P and the secondary coil S connected in series cumulatively, may be obtained by leaving the switches 31, 32 and 33 in their right hand position and in operating the high resistance rheostat HR until the volt meter reading is 70 volts. Under this condition current flows from the secondary winding of the transformer 25 through the following circuit:—beginning at the right hand terminal of this secondary winding rheostat HR, wires 40 and 41, rheostat LR, wire 42, the .03 coil of the ammeter $A^1$, wire 43, contact 44, wire 45, contact 46, wires 47 and 48, connector 37—17, wire 49, primary coil P, wire 50, connector 17—37, wires 51 and 52, contact 53, wires 54 and 55, connector 36—15, wire 56, secondary coil S, wire 57, connector 15—36, wires 58 and 60, contact 61, wires 62, 63, 64 and 65, back to the left hand terminal of the secondary winding of transformer 25. It will be noted that under the condition assumed the left hand terminal of the voltmeter $V^1$ is connected to the left hand terminal of the secondary winding of transformer 25 through the wires 65 and 66, contact 67 of switch 32 and wire 68, whereas the right hand terminal of the volt meter is connected to a point below the rheostats HR and LR through the medium of wires 69 and 70, contact 71 and wire 72, from which it appears that the ammeter $A^1$ reads the current flowing through the coils S and P in series, and the volt meter $V^1$ reads the voltage across these coils and ammeter. Under the conditions assumed with the voltage adjusted to 70 volts as indicated in the above table, the current in the ammeter $A^1$ should not be less than .005 amps and should not be higher than .012 amps.

Referring again to the above table under test No. 2 it will appear that the impedance of the primary coil of the receiver may be tested by operating the levers 31 and 33 to the left and leaving the lever 32 in its right hand position. Under this condition of the levers 31, 32 and 33 alternating current may flow from the secondary winding of the transformer 25 through the low resistance rheostat LR and the large scale coil of the ammeter $A^1$ through the following circuit:—beginning at the right hand side of the secondary winding of transformer 25, wire 75, contact 76 assuming its dotted position, wires 77 and 41, rheostat LR, wire 42, the one ampere scale coil of the ammeter $A^1$, wire 78, contact 44 assuming its dotted position, wires 79 and 48, connector 37—17, wire 49, primary coil P, wire 50, connector 17—37, wires 51 and 80, contact 81 assuming its dotted position, wires 82, 63, 64 and 65 to the left hand terminal of the secondary winding to transformer 25. Since the lever 32 has not been operated the volt meter $V^1$ is connected in the same way as it was under test No. 1. Attention is directed to the fact that the high resistance rheostat HR is now shunted out by the contact 76 of the lever 31. If the rheostat LR is now adjusted until the volt meter $V^1$ indicates 70 volts (see table), the current may be read on the one ampere scale of the ammeter $A^1$ and if this current reads between .05 and .3 amperes the primary coil is pronounced to be in good condition.

Having now by tests observed the impedance of the primary coil and the secondary coil in series and also the impedance of the primary coil alone, it would seem unnecessary to specifically determine the impedance of the secondary coil, for this may be obtained by subtraction. The condition of the secondary coil may be checked in another way, namely, by observing the transformer voltage ratio between the primary and the secondary windings P and S. Let us remember now that the switch levers 31 and 33 have already been moved to the left hand position, and let us observe how movement of the lever 32 to its left hand position, with 70 volts applied to the primary coil P, the secondary coil S has a voltage induced therein and is connected directly to the volt meter $V^1$ through the following circuit:—beginning at the terminal 56 of the secondary coil S, connector 15—36, wires 55 and 83, contact 71 assuming its dotted position, wires 84 and 69, volt meter $V^1$, wires 68 and 85, contact 67 assuming its dotted position, wire 86, contact 61 assuming its dotted position, wires 87 and 58, connector 36—15, wire 57 to the other terminal of the secondary coil S. If, with a voltage of 70 volts applied to the primary coil P, and the voltage of the secondary winding S as determined by the circuit just traced is not below 120 volts and not above 136 volts, the transformer ratio between the primary coil P and the secondary coil S is pronounced satisfactory.

If now, the tester wishes to determine whether the primary relay R¹ has its winding in a safe condition he will operate the levers 31 and 32 to the right and leave the lever 33 in its left hand position. Under this condition the volt meter V¹ is transferred back to its original position, where it reads the voltage applied to the apparatus to be tested. Also, with the switches in the positions just mentioned current may flow through the relay R¹ through the following circuit:—beginning at the right hand terminal of the secondary winding of transformer 25, rheostat HR, wires 40 and 41, rheostat LR, wire 42, the .03 coil of the ammeter A¹, wire, 43, contact 44, wires 45 and 90, contact 46 assuming its dotted position, wire 91, connector 35—14, wire 92, winding of the relay R¹, wire 93, connector 14—35, wire 94, contact 53 assuming its dotted position, wires 95, 64 and 65 to the left hand terminal of the secondary winding of transformer 25. The testor may now adjust the high resistance rheostat HR to apply 75 volts to the relay R¹ under which condition the current flowing through the relay R¹ and through the low scale coil of the ammeter A¹ should read between .005 and .01 amperes, under which condition the relay R¹ is pronounced to be O. K. insofar as its winding is concerned.

Applicant has thus devised test apparatus which may be used by an inexperienced and untrained man to determine whether the windings of the receiver, the inductor or the primary relay of the train control system are properly intact and have the necessary impedance to make them inductively efficient, and has constructed this apparatus in such a way that such inexperienced testor may connect all of the devices to be tested at one time, may then test these one at a time, and cannot injure the delicate instruments which must be necessarily used for testing apparatus of this kind, nor can he apply excessive voltages to the various coils to be tested.

Having thus shown and described only two specific embodiments of apparatus for testing inductors, receivers and relays of train control apparatus, it is desired to be understood that the particular embodiment of the invention illustrated in Fig. 2 of the drawing has not been selected for the purpose of illustrating the scope of the invention nor the exact construction preferably employed in practicing such invention, but has been selected for the purpose of illustrating the nature of the invention as well as the manner in which it may be applied in practicing the same, and that various changes, modifications and additions may be made to adapt the invention to the particular kind of inductive apparatus to be tested, all without departing from the spirit or scope of the invention or the idea of means underlying the same, except as demanded by the scope of the following claims.

What I claim as new is:—

1. Test apparatus of the type described for testing an inductive device having two coils linking a single core comprising, a casing having two pairs of lead-out wires one pair for each of said coils, a source of alternating current, a voltmeter in said casing, an ammeter in said casing, and switches and circuits effective when one coil is connected to one pair of lead-out wires and the other coil is connected to the other pair of lead-out wires for either connecting said coils in series with each other and with said ammeter or for connecting one of said coils across said source of alternating current and connecting said other coil across said voltmeter.

2. Test apparatus of the type described for testing an inductive device having two coils linking a single core comprising, a casing having two pairs of lead-out wires one pair for each of said coils, a source of alternating current, a voltmeter in said casing, an ammeter in said casing, and switches and circuits effective when one coil is connected to one pair of lead-out wires and the other coil is connected to the other pair of lead-out wires for either connecting said coils in series with each other and with said ammeter and with said voltmeter connected in multiple therewith or for connecting one of said coils across said source of alternating current and connecting said other coil across said voltmeter.

3. Test apparatus of the type described for testing an inductive device having two coils magnetically related comprising, a casing having two pairs of lead-out wires one pair for each of said coils, a source of alternating current, a voltmeter in said casing, an ammeter in said casing, and means effective when one coil is connected to one pair of lead-out wires and the other coil is connected to the other pair of lead-out wires for either connecting said coils in series with each other and with said ammeter or for connecting one of said coils across said source of alternating current and connecting said other coil across said voltmeter.

4. Test apparatus of the type described for testing an inductive device having two inductively related coils comprising, a casing having two pairs of lead-out wires one pair for each of said coils, a source of alternating current, a voltmeter in said casing, an ammeter in said casing, and means effective when one coil is connected to one pair of lead-out wires and the other coil is connected to the other pair of lead-out wires for either connecting said coils in series with each other and with said ammeter and with said voltmeter connected in multiple therewith or for connecting one of said coils across said source of alternating current and connecting said other coil across said voltmeter.

HARMON WICKSON.